(12) United States Patent
Hamdi

(10) Patent No.: US 12,499,238 B2
(45) Date of Patent: Dec. 16, 2025

(54) SYSTEMS AND METHODS FOR RECONNAISSANCE OF A COMPUTER ENVIRONMENT

(71) Applicant: Acentium Inc., Boston, MA (US)

(72) Inventor: Amine Hamdi, Boston, MA (US)

(73) Assignee: Acentium Inc., Boston, MA (US)

( * ) Notice: Subject to any disclaimer, the term of this patent is extended or adjusted under 35 U.S.C. 154(b) by 793 days.

(21) Appl. No.: 17/490,981

(22) Filed: Sep. 30, 2021

(65) Prior Publication Data

US 2022/0108024 A1 Apr. 7, 2022

Related U.S. Application Data

(60) Provisional application No. 63/086,839, filed on Oct. 2, 2020.

(51) Int. Cl.
| | | |
|---|---|---|
| *G06F 21/57* | (2013.01) | |
| *G06F 21/56* | (2013.01) | |
| *G06F 16/903* | (2019.01) | |

(52) U.S. Cl.
CPC ............ *G06F 21/577* (2013.01); *G06F 21/56* (2013.01); *G06F 16/90335* (2019.01); *G06F 2221/034* (2013.01)

(58) Field of Classification Search
CPC .. G06F 21/577; G06F 21/56; G06F 16/90335; G06F 2221/034; G06F 21/57; H04L 63/1483
USPC .......................................................... 726/25
See application file for complete search history.

(56) References Cited

U.S. PATENT DOCUMENTS

| | | | | |
|---|---|---|---|---|
| 9,800,603 B1* | 10/2017 | Sidagni | ............... | H04L 63/1433 |
| 11,106,526 B1* | 8/2021 | Jahr | .................... | G06F 16/1734 |
| 2008/0209566 A1* | 8/2008 | Ziv | ..................... | H04L 63/1433 |
| | | | | 726/25 |
| 2014/0173739 A1* | 6/2014 | Ahuja | .................. | G06F 21/577 |
| | | | | 726/25 |
| 2014/0245449 A1* | 8/2014 | Powell | ............... | H04L 63/1433 |
| | | | | 726/25 |

(Continued)

OTHER PUBLICATIONS

Clio Sungyoung et al: "Cyber Kill Chain based Threat Taxonomy and its application on Cyber Common Operational Picture" 2018 International Conference on Cyber Situational Awareness, Data Analytics and Assessment (Cyber SA), IEEE Jun. 11, 2018 (Jun. 11, 2018), pp. 1-8.

(Continued)

*Primary Examiner* — Philip C Lee
(74) *Attorney, Agent, or Firm* — Foley & Lardner LLP

(57) ABSTRACT

Systems and methods for reconnaissance of computer environments can include performing, by one or more processors, a hierarchical process to discover information of a computer environment. The one or more processors can discover a plurality of assets and a plurality of features of the computer environment, responsive to performing the hierarchical process. The one or more processors can generate, using the plurality of assets and the plurality of features of the computer environment, a representation of an architecture of the computer environment. The one or more processors can generate, based at least on the representation of the architecture of the computer environment, one or more attack vectors of the computer environment.

20 Claims, 9 Drawing Sheets

(56) References Cited

U.S. PATENT DOCUMENTS

2017/0060958 A1\* 3/2017 Van Rest ............ G06F 16/9024

OTHER PUBLICATIONS

International Search Report and Written Opinion on PCT Appl. Ser. No. PCT/US2021/053076 dated Feb. 7, 2022.

Jia Fangcheng et al: "Towards Automated Generation and Visualization of Hierarchical Attack Representation Models", 2015 IEEE International Conference on Computer and Information Technology; Ubiquitous Computing and Communications; Dependable, Autonomic and Secure Computing;—Pervasive Intelligence and Computing, IEEE, Oct. 26, 2015 (Oct. 26, 2015), pp. 1689-1696,.

Zeng Wen et al: "Modelling Hybrid Cyber Kill Chain", Proceedings of the International Workshop on Petri Nets and Software Engineering (PSNE2019), Jun. 23, 2019 (Jun. 23, 2019), pp. 143-160.

International Preliminary Report on Patentability on PCT Appl. Ser. No. PCT/US2021/053076 dated Apr. 13, 2023 (9 pages).

\* cited by examiner

SYSTEMS AND METHODS FOR RECONNAISSANCE OF A COMPUTER ENVIRONMENT

CROSS REFERENCE TO RELATED APPLICATIONS

This application claims priority to, and the benefit of, U.S. Provisional Application No. 63/086,839 filed on Oct. 2, 2020, and entitled "SYSTEMS AND METHODS FOR RECONNAISSANCE OF A COMPUTER ECOSYSTEM," which is incorporated herein by reference in its entirety.

FIELD OF THE DISCLOSURE

The present application relates generally to systems and methods for reconnaissance of a computer environment. Specifically, the present application relates to determining the extent discoverability or detectability of assets and/or features of the computer environment through external reconnaissance (e.g., based on data publicly available outside the computer environment).

SUMMARY OF THE DISCLOSURE

According to at least one aspect, a system can include one or more processors and a memory storing computer code instructions. The computer code instructions, when executed by the one or more processors, cause the one or more processors to perform a hierarchical process to discover information of the computer environment. The hierarchical process can include a plurality of consecutive steps, wherein additional information searched at one step depends on information acquired in one or more previous steps of the plurality of consecutive steps. The one or more processors can discover a plurality of assets and a plurality of features of the computer environment, responsive to performing the hierarchical process. The one or more processors can generate, using the plurality of assets and the plurality of features of the computer environment, a representation of an architecture of the computer environment. The one or more processors can generate, based at least on the representation of the architecture of the computer environment, one or more attack vectors of the computer environment.

According to at least another aspect, a method can include performing, by one or more processors, a hierarchical process to discover information of the computer environment, the hierarchical process including a plurality of consecutive steps, wherein additional information searched at one step depends on information acquired in one or more previous steps of the plurality of consecutive steps. The method can include discovering, by the one or more processors, a plurality of assets and a plurality of features of the computer environment, responsive to performing the hierarchical process. The method can include generating, by the one or more processors, using the plurality of assets and the plurality of features of the computer environment, a representation of an architecture of the computer environment. The method can include generating, by the one or more processors, based at least on the representation of the architecture of the computer environment, one or more attack vectors of the computer environment.

According to yet another aspect, a computer-readable medium can include computer code instructions stored thereon. The computer code instructions when executed by one or more processors can cause the one or more processors to perform a hierarchical process to discover information of the computer environment. The hierarchical process can include a plurality of consecutive steps, wherein additional information searched at one step depends on information acquired in one or more previous steps of the plurality of consecutive steps. The one or more processors can discover a plurality of assets and a plurality of features of the computer environment, responsive to performing the hierarchical process. The one or more processors can generate, using the plurality of assets and the plurality of features of the computer environment, a representation of an architecture of the computer environment. The one or more processors can generate, based at least on the representation of the architecture of the computer environment, one or more attack vectors of the computer environment.

DETAILED DESCRIPTION

For purposes of reading the description of the various embodiments below, the following descriptions of the sections of the specification and their respective contents may be helpful:

Section A describes a computing and network environment which may be useful for practicing embodiments described herein.

Section B describes reconnaissance systems and methods.

Section C describes mitigation of attack risk.

A. Computing and Network Environment

Figure 1A:
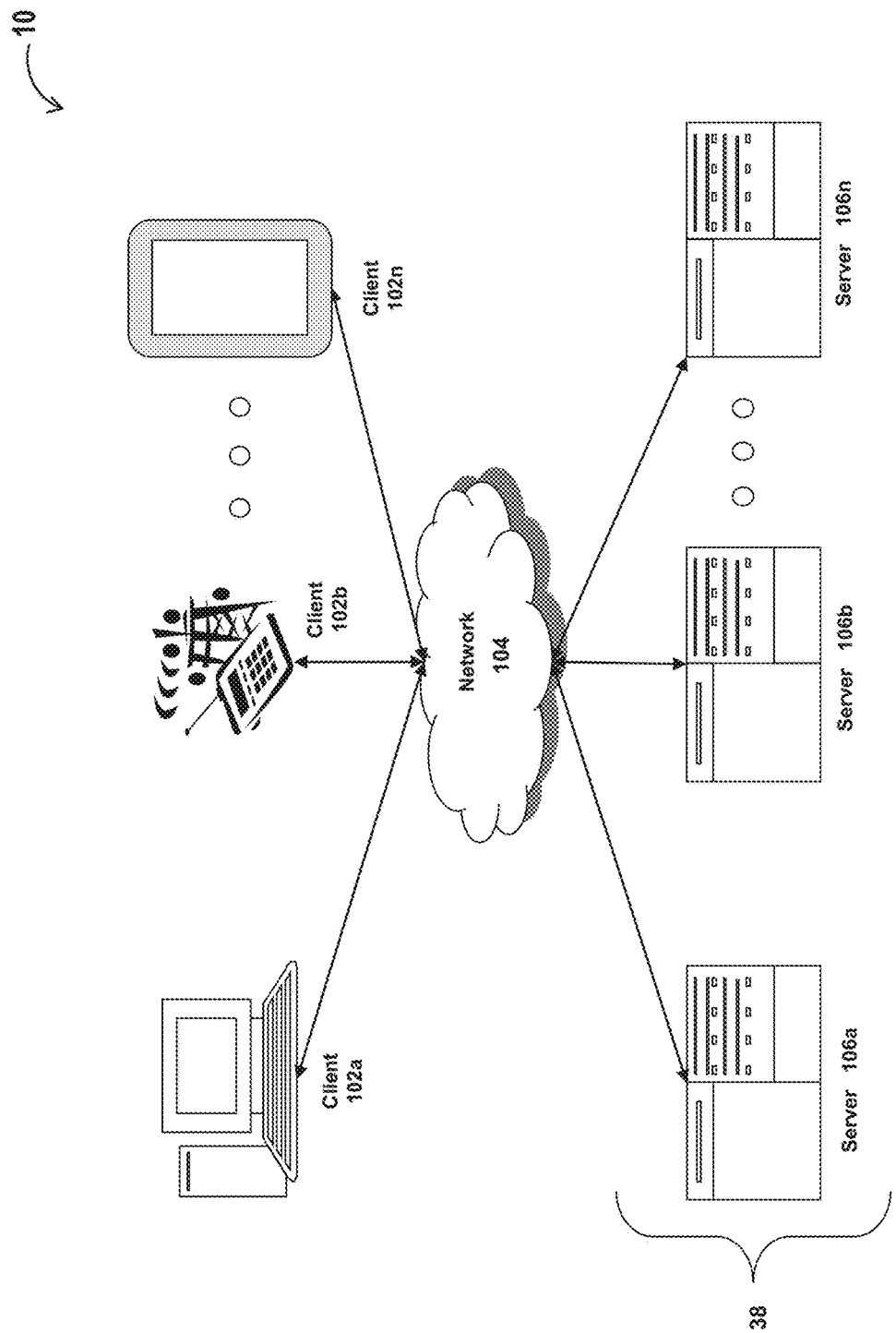
FIG. 1A is a block diagram depicting an embodiment of a network environment comprising local devices in communication with remote devices.

In addition to discussing specific embodiments of the present solution, it may be helpful to describe aspects of the operating environment as well as associated system components (e.g., hardware elements) in connection with the methods and systems described herein. Referring to FIG. 1A, an embodiment of a computing and network environment 10 is depicted. In brief overview, the computing and network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the computing and network environment 10 may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS 8 or 10, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, firewall, Internet of Things (IoT) controller. In one embodiment, the server 106 may be referred to as a remote machine or a node. In another embodiment, a plurality of nodes 290 may be in the path between any two communicating servers.

Figure 1B:
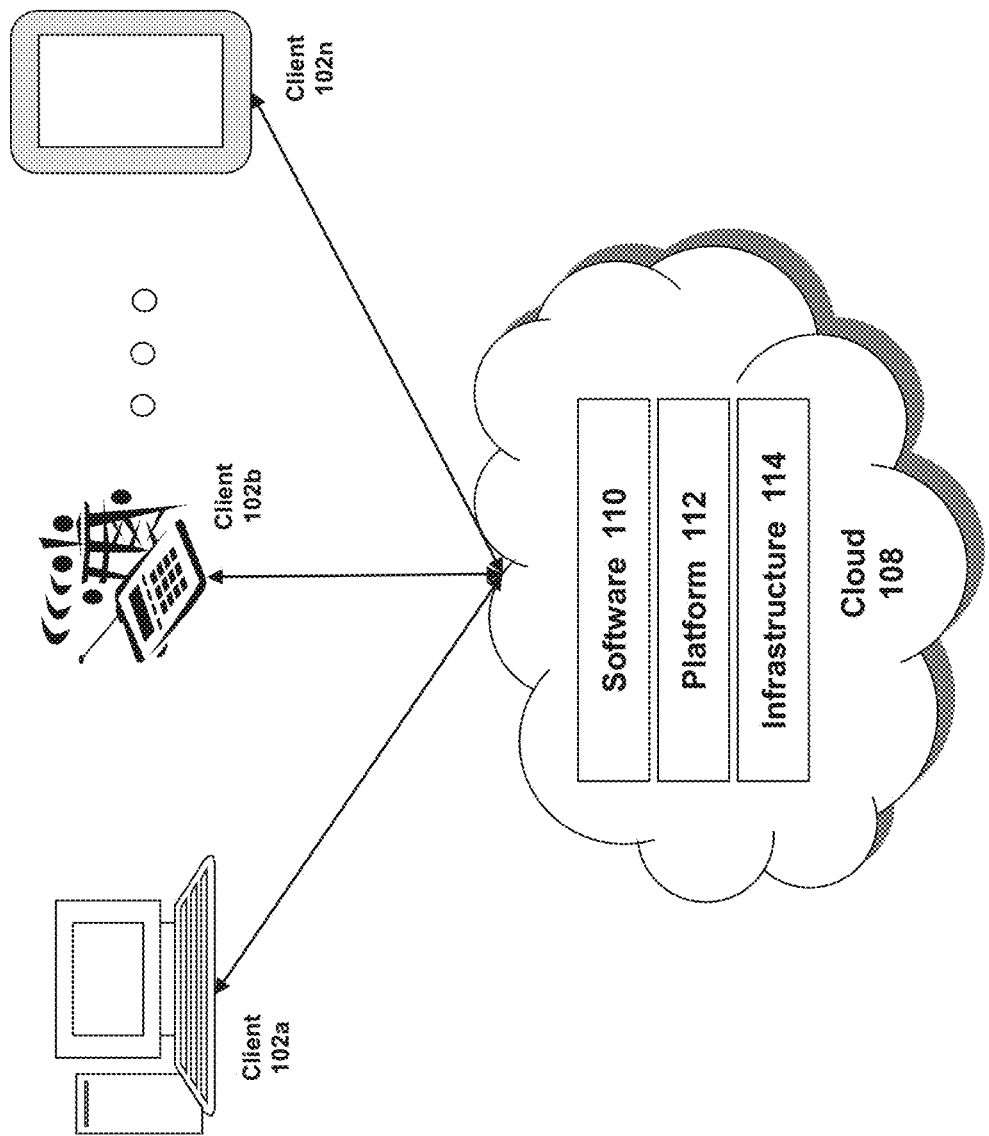
FIGS. 1B-1D are block diagrams depicting embodiments of computers useful in connection with the methods and systems described herein.

Referring to FIG. 1B, a cloud computing environment is depicted. The cloud computing environment can be part of the computing and network environment 10. A cloud computing environment may provide client 102 with one or more resources provided by the computing and network environment 10. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, for example, Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
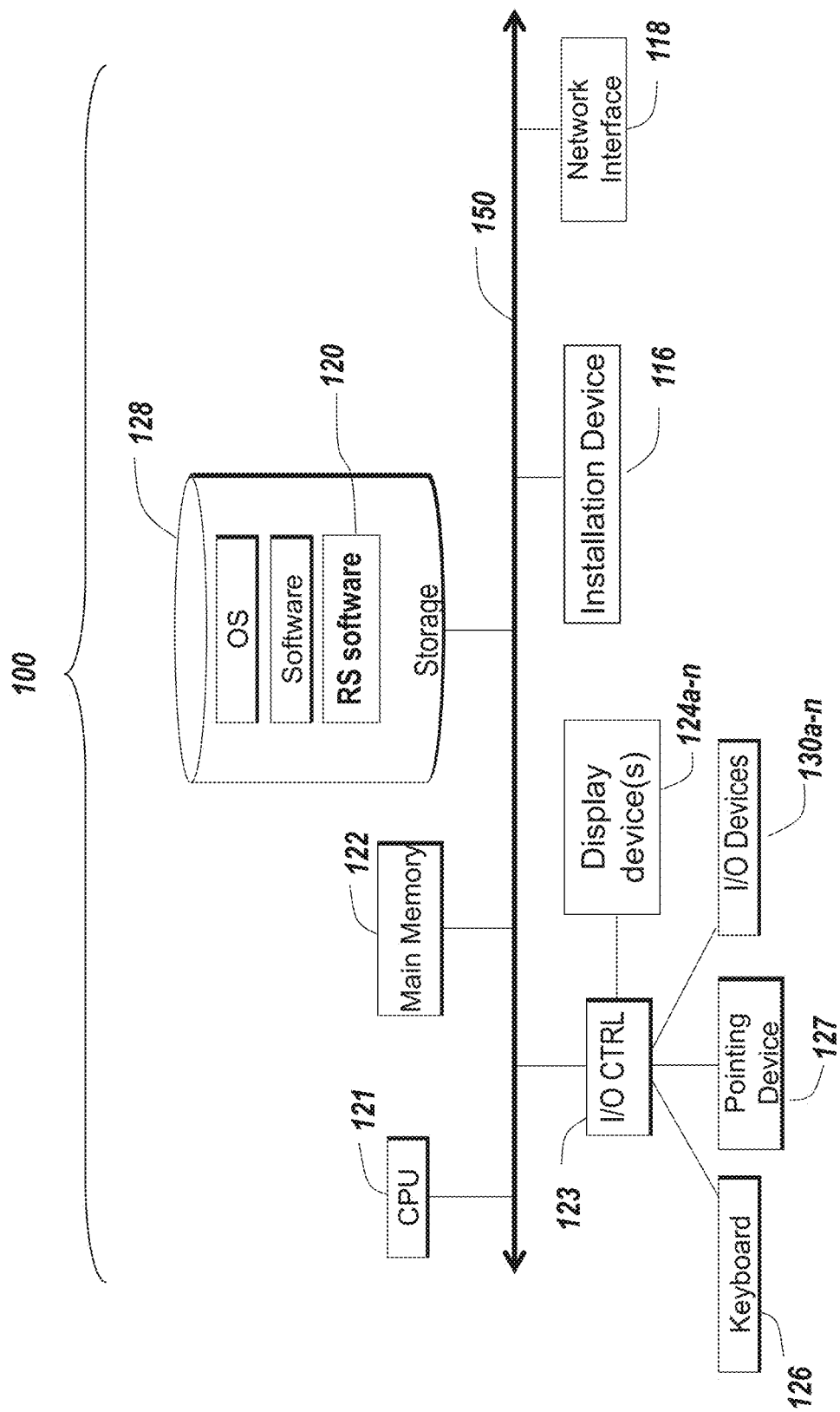
Figure 1D:
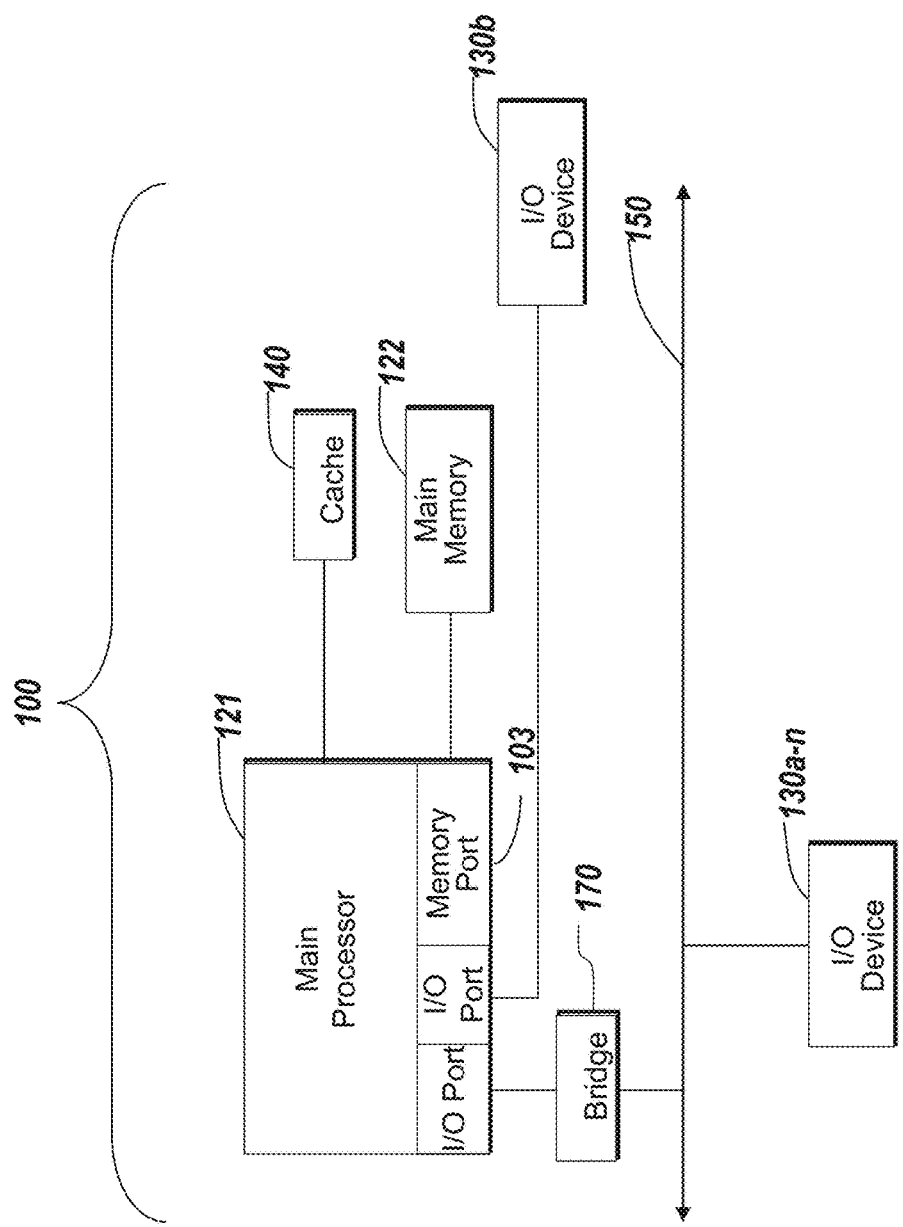

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, a reconnaissance system (RS) software 120, and/or other software, among others. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the RS software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is a eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, central processing unit (CPU) and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Reconnaissance Systems and Methods

The present disclosure relates to systems and methods for reconnaissance of computer environments, such as enterprise networks, cloud systems, banking systems, electric utility systems, networks of medical devices or a combination thereof, among others. Hackers usually rely on discoverable information about a computer environment to identify respective security holes, and intrude into the computer environment. For example, hackers may identify, one or more serves, communication ports, user login information, device vulnerabilities or a combination thereof, among others, and employ the identified information to mount a malware attack, phishing attack, man-in-the-middle attack, SQL injection attack, zero-day exploit attack, or domain name system (DNS) tunneling attack, among others, on the computer environment.

From the perspective of an owner, a stakeholder or an administrator of the computer environment, the goal is to monitor and manage the operational and cybersecurity aspects of the computer environment to ensure efficient and reliable operation as well as prevention of undesired intrusions or attacks. Given that information related to the computer environment that can be inferred by external entities is relevant, determining and monitoring such information can help manage and secure the computer environment. For example, identifying the assets of the computer environment, and/or respective features, which are externally discoverable can help identify (i) security holes of the computer environment, and (ii) suspicious or unrecognized assets or activities associated with the computer environment. Identifying the security holes and the suspicious assets can help improve the security or management strategy of the computer environment.

In the current disclosure, systems and methods for reconnaissance or discovery of computer environments are described. The systems and methods employ an automatic hierarchical approach for identifying discoverable assets of the computer environment and/or respective features. The automatic hierarchical reconnaissance approach can include a plurality of reconnaissance or discovery steps designed to expand at each step the amount of discovered information related to the computer environment. The automatic hierarchical reconnaissance approach can be configured to generate a comprehensive set of discoverable information related to the computer environment. For instance, the automatic hierarchical reconnaissance approach can be designed to identify individuals or entities associated with the computer environment, such as employees and/or third-party service providers, and determine assets or features of the computer environment that are accessible, or known, to such individuals or entities. In general, the automatic hierarchical reconnaissance approach can be designed to identify all, or at least most of, discoverable information of the computer environment.

The systems and methods described herein can reconstruct a visual representation of at least a partial architecture of the computer environment based on the discovered assets and/or features. The reconstructed visual representation can include a mesh, map or node network illustrating the discovered assets and the relationships, e.g., interconnections or dependencies, between such assets. The systems and methods can generate one or more attack vectors based on the reconstructed architecture of the computer environment. The systems and methods can determine severity levels of the generated attack vectors based on, for example, internal information of the computer environment.

Figure 2:
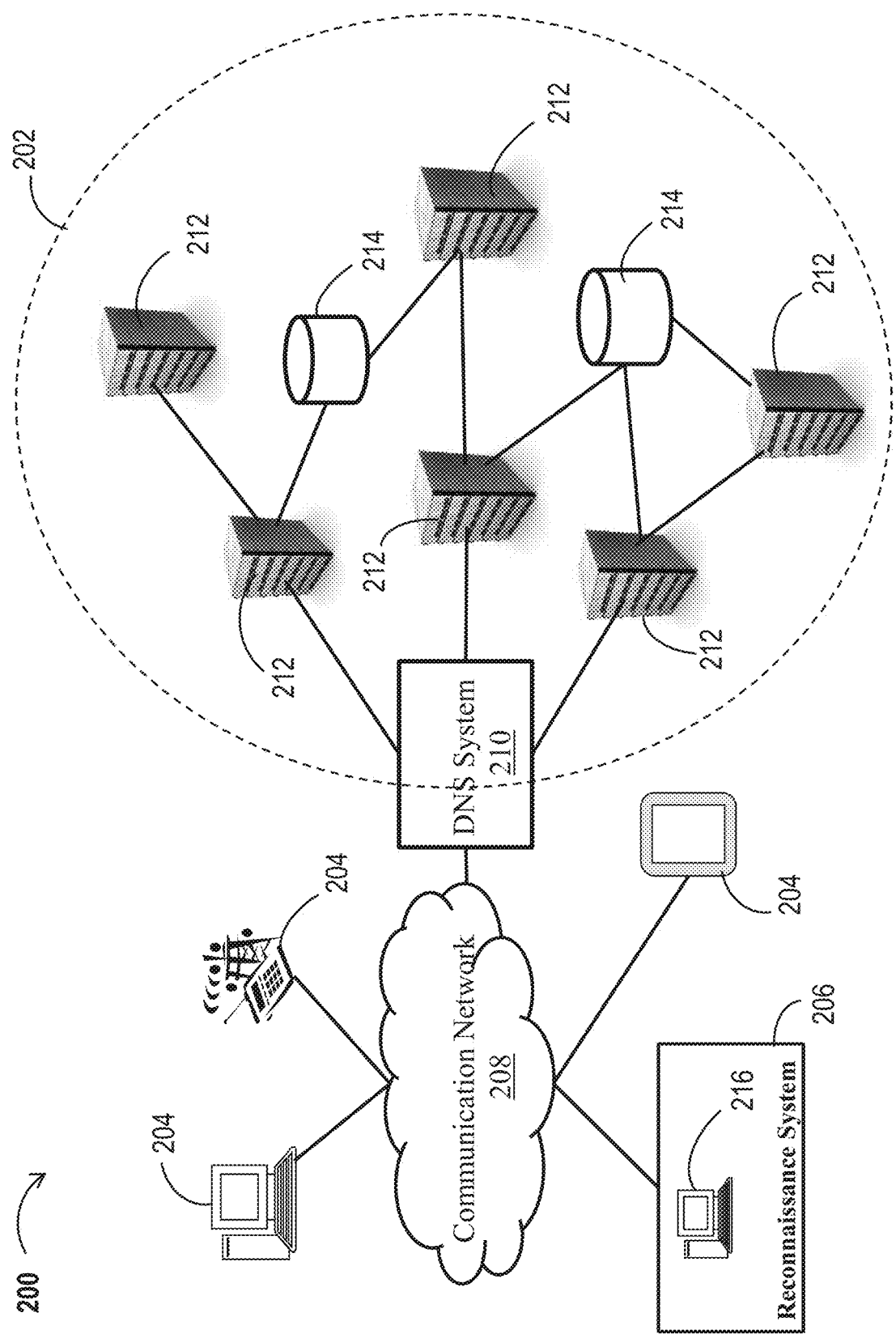
FIG. 2 is a block diagram illustrating an example network environment employing reconnaissance of computer environments, according to an example embodiment.

Referring to FIG. 2, a block diagram illustrating an example network environment 200 employing reconnaissance of computer environments is shown. The network environment 200 can include a computer environment 202 (also referred to herein as a computing environment or a computing network), a plurality of communication devices 204, a reconnaissance system 206, a communication network 208 and a domain name system (DNS) 210. The computer environment 202, the plurality of communication devices 204, the reconnaissance system 206 and the DNS 210 can be communicatively coupled or interconnected via the communication network 208. The communication network 208 can be similar to the network 104 described in relation to FIG. 1A. The reconnaissance system 206 can include one or more computing devices 216 configured to perform reconnaissance methods described herein.

The computer environment 202 can include an enterprise computer network, a cloud network or system, a banking computer system, an electric utility system, a network of medical devices, a social network, a communications network (e.g., wireless communications network), a streaming system, a security monitoring system, the like or a combination thereof. The computer environment 202 can include any combination of communicatively connected electronic devices, electrical devices and/or electromechanical devices. The computer environment 202 can include a plurality of computer servers 212, one or more databases 214, one or more network device (not shown in FIG. 2), such as routers, network switches or modems, one or more firewalls (not shown in FIG. 2), other electronic devices (not shown in FIG. 2) or a combination thereof. The computer servers 212 can include web servers, email servers, application servers, communication servers, solution stack servers, the like or a combination thereof. The computer servers 212, the databases 214, the network devices and/or the other electronic devices can be communicatively coupled to each other. In general, various devices of the computer environment 202 can be dependent on each other. The interdependencies can include data dependency, software dependency, storage dependency, communication dependency, security dependency or a combination thereof, among other dependencies.

The computer environment 202 can be associated with a single geolocation, or can be distributed over a plurality of geolocations. The computer environment 202 can include one or more domains with one or more corresponding domain names. The domain name(s) can be associated with or can be indicative of one or more websites. The computer environment 202 can be accessible externally via the website(s) associated with the domain name(s). The website(s) can include an Internet website, an intranet website or combination of both. The client devices 204 can access the website(s) associated with the computer environment 202 via the communications network 208 and the DNS system 210.

The DNS 210 can include a plurality of computer servers (not shown in FIG. 2) configured to map each uniform resource locator (URL) of a web site or web page to the corresponding Internet Protocol (IP) address of the hosting server. In some implementations, the computer servers of the DNS 210 can be arranged within a data center, the computer environment 202 or within both. For instance, on or more computer servers of the DNS 210 can be arranged in the data center while one or more other computer servers can be arranged in the computer environment 202.

The communication devices 204 can include client devices similar to clients 102 described in relation with FIGS. 1A and 1B. One or more computing devices 204 can be associated with the computer environment 202, and can be configured to access the computer environment 202 via a respective intranet website or other communication protocols. For instance, users of the one or more computing devices 204 can have respective login identifiers (IDs) and passwords for accessing the intranet website. The computing devices 204 can include devices that do not belong to the computer environment 202, but still can access websites, webpages or other assets of the computer environment 202. The extent of possible access of such computing devices 204 to the computer environment 202 can be indicative of possible ways of attacking the computer environment 202 or assets thereof.

Figure 3:
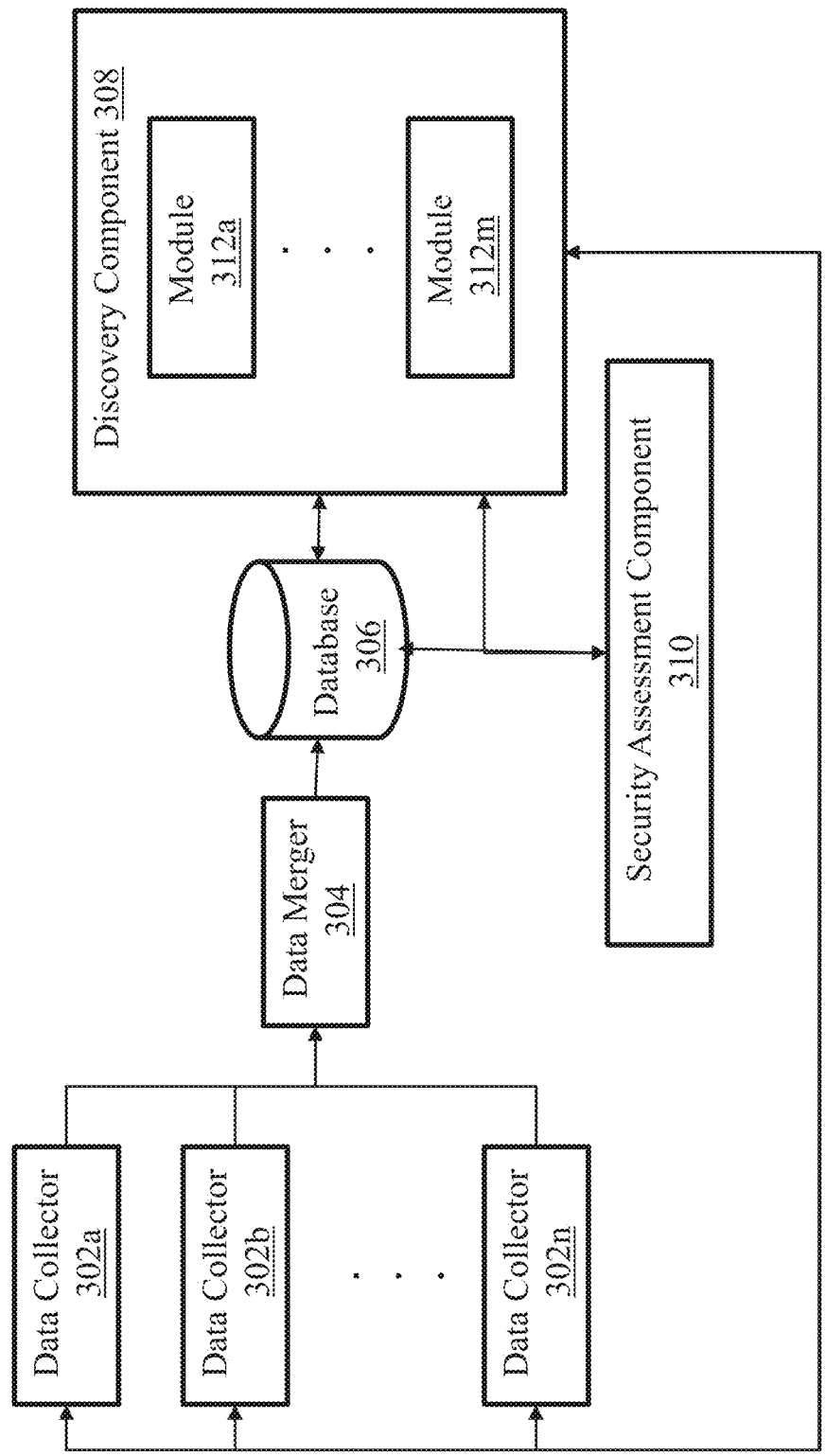
FIG. 3 shows an example block diagram of a reconnaissance system, according to an example embodiment.

FIG. 3 shows a block diagram illustrating an example implementation of the reconnaissance system 206 shown in FIG. 2. The reconnaissance system 206 and any of the respective components described herein can be implemented as hardware, firmware, software or a combination thereof. For instance, the reconnaissance system 206 can include one or more processors such as processor 121 of FIGS. 1C and 1D and a memory such as the main memory 122 or the cache memory 140. The memory can store computer code instructions, which when executed by the one or more processors can cause the one or more processors to perform methods described herein (e.g., methods 400 and 600 of FIGS. 4 and 6) or steps thereof associated with the reconnaissance system 206. The reconnaissance system 206 can include a plurality of data collectors 302a-302n, referred to herein either individually or collectively as data collector(s) 302, a data merger 304, a database 306, a discovery component 308 and a security assessment component 310. The discovery component 308 can include a plurality of discovery or reconnaissance modules 312a-312m referred to herein either individually or collectively as discovery (or reconnaissance) module(s) 312.

Figure 4:
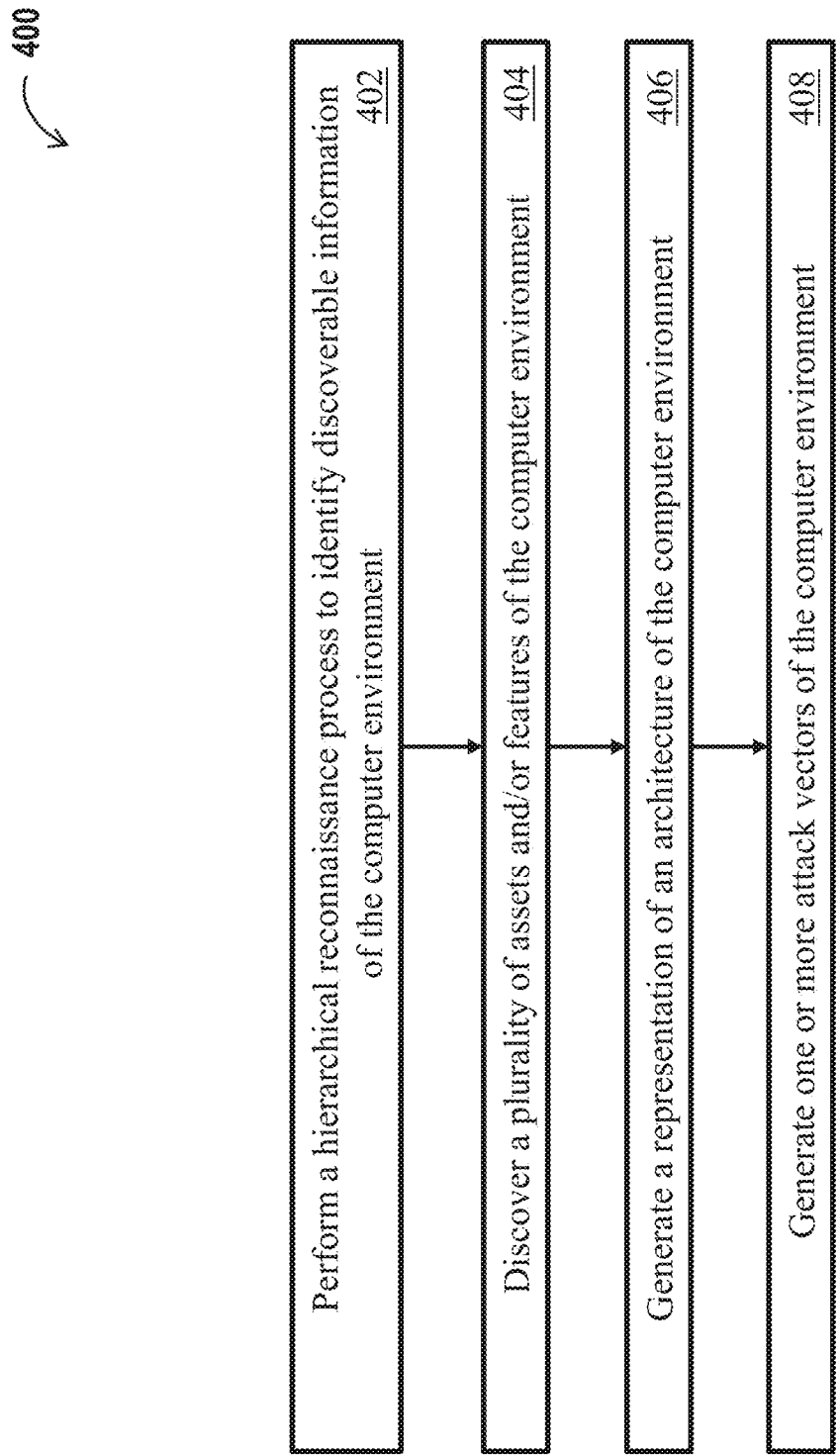
FIG. 4 shows a flowchart illustrating a method for reconnaissance of computer environments, according to an example embodiment.

FIG. 4 shows a flowchart illustrating a method 400 for computer environment reconnaissance, according to an example embodiment. The method 400 can be performed or executed by the reconnaissance system 206. The method 400 can include performing or executing a hierarchical reconnaissance process (STEP 402), and discovering assets and/or features of the computer environment responsive to performing or executing the hierarchical reconnaissance process (STEP 404). The method 400 can include constructing or generating a representation of an architecture (or a partial architecture) of the computer environment based on the discoverable assets or features (STEP 406). The method 400 can include generating one or more attack vectors of the computer environment (STEP 480).

Referring to FIGS. 3 and 4, the method 400 can include performing or executing a hierarchical reconnaissance process (STEP 404) to discover assets and/or features of the computer environment 202. The method 400 can include the reconnaissance system 206 receiving input information related to or indicative of a computer environment (STEP 402). For instance, the reconnaissance system 206 can receive a domain name, a name of an organization or company, e.g., that owns the computer environment 202, an indication of a person or entity that registered a domain name of the computer environment 202, or other information associated with the computer environment 202 as input. The input data can be indicative of the computer environment 202, a domain name of the computer environment, or can include information that can be used to identify the computer environment. For example, if the input data includes a name of a person or entity that registered a domain name of the computer environment 202, the reconnaissance system 206 can use the input data to identify the computer environment 202 and/or one or more domain names associated with the computer environment 202. The reconnaissance system 206 can receive the input information via an input device, such as a keyboard, a touch screen or a microphone, among others. In some implementations, the reconnaissance system 206 can receive the input information from a memory. The input data can be used by the reconnaissance system 206 as a starting point of the hierarchical reconnaissance process.

Figure 5:
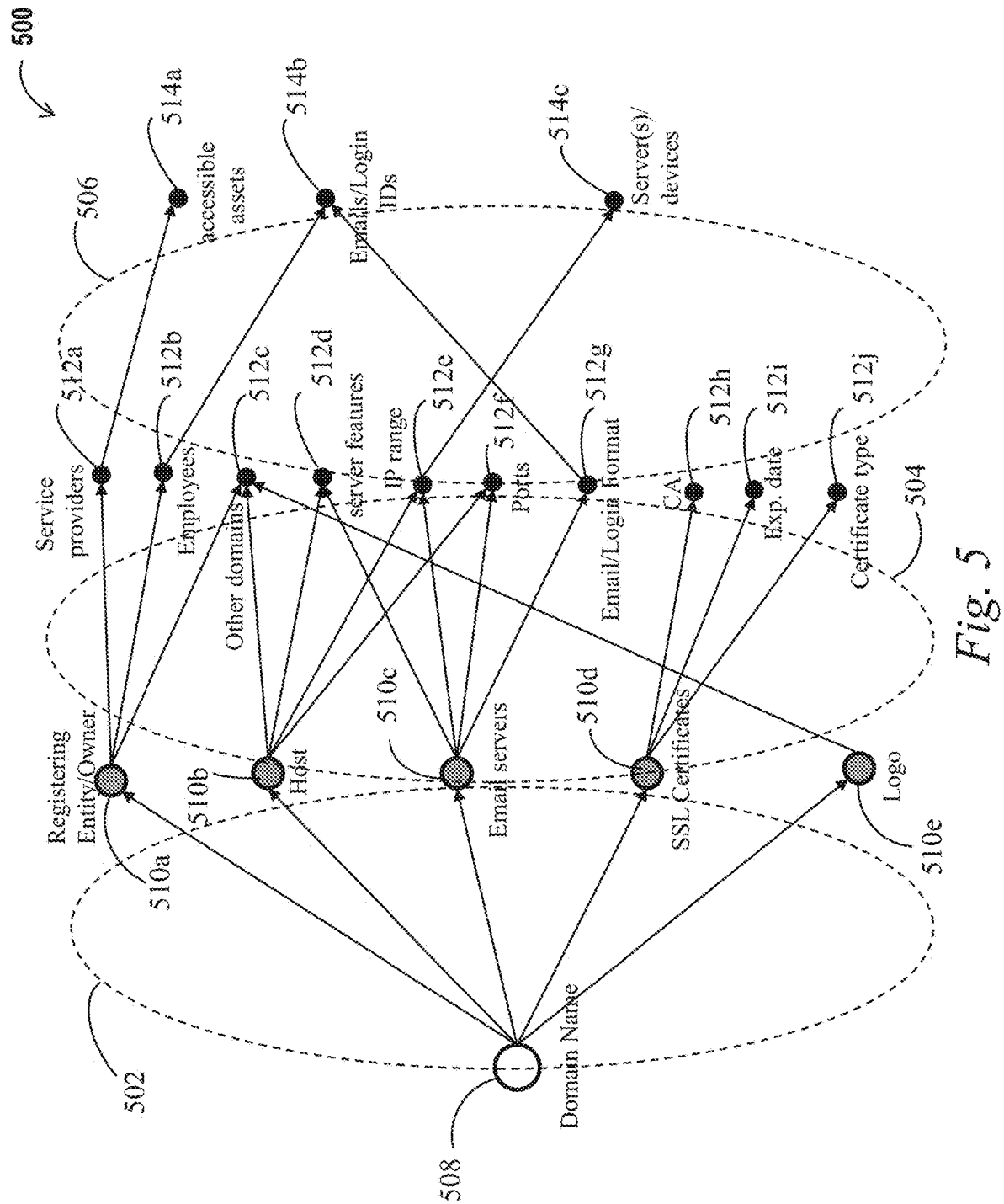
FIG. 5 shows a diagram illustrating a hierarchical reconnaissance process, according to an example embodiment.

The hierarchical reconnaissance process can include a plurality of consecutive steps, wherein additional information searched or queried at one step depends on information acquired in one or more previous steps of the plurality of consecutive steps. Referring to FIG. 5, a diagram illustrating an example hierarchical reconnaissance process 500 is shown, according to an example embodiment. The hierarchical reconnaissance process 500 can include the reconnaissance steps 502, 504 and 506. Each reconnaissance step can include a corresponding predefined set of additional data or information to be searched or acquired, or a corresponding predefined set of queries or searches, based on the information or data acquired so far. For instance, each step of the plurality of consecutive steps can include, for each asset type, a corresponding predefined set of queries or searches to be executed as part of the reconnaissance step. The arrows in FIG. 5 represent queries or searches made at each reconnaissance step to acquire the corresponding predefined set of additional data or information. The nodes in FIG. 5 represent the pieces of data or information acquired at the end of each reconnaissance step. The data collectors 302 can be configured to acquire at each reconnaissance step the corresponding predefined set of additional data or information.

In some implementations, the data collectors 302 can determine, at each step of the plurality of consecutive steps, one or more predefined sets of queries or searches to be executed based on already discovered assets of the computer environment 202. For example, at each step, the data collectors 302 can execute predefined sets of queries or searches associated with asset types (or feature types) of already known or discovered assets (or features) of the computer environment 202 (e.g., provided as input for step 1 or discovered in a previous step).

The data collectors 302 can collect, request or obtain data from a plurality of data sources. The data sources can include Internet scanners such as shodan.io, Zmap, Internet Census, shadowserver, Masscan, project sonar, Censys, VNC pwnage, Zoom Eye, faf.so, GreyNoise, the like or a combination thereof. The data sources can include search engines such as GOOGLE search engine, BING search engine or other search engines. The data sources can include websites or databases accessible via the Internet. The data sources can be external data sources that do not belong to the computer environment.

The data collectors 302 can be different from one another based on the data sources from which each data collector 302 receives data, the type of data collected by each data collector, the data collection method(s) or technique(s) used by each data collector 302, or a combination thereof. For instance, one data collector (e.g., data collector 302a) can be configured or structured to collect or receive information about hardware assets of the computer environment 206 such as servers 212. For example, server information collected by the data collector 302a can include server name, server description, server Internet Protocol (IP) address, server communication ports, server interconnections, software or applications running on the server or a combination thereof. Another data collector (e.g., data collector 302b) can be configured or structured to collect or receive data related to users of the computer environment 202. User information can include user name, description of user position in the organization associated with computer environment 202, user login information or a combination thereof. One or more data collectors 302 can be configured or structured to collect or receive data from a specific type of data sources, such as Internet scanners. One or more other data collectors 302 can be configured or structured to employ a specific type of data collection method(s) or technique(s), such as querying devices of the computer environment 202.

The data merger 304 can filter and/or merge data obtained by the data collectors 302 from various data sources at each reconnaissance step, as well as data previously acquired at earlier steps or stored in the database 306. The data can be obtained from a plurality of independent data sources and/or over a plurality of data acquisition iterations. The data can include redundancies as one or more data items can be received from multiple data sources or can be repeatedly received over multiple data acquisitions. Redundant data items may not necessarily be identical. The data merger 304 can, at each data acquisition iteration, compare recently received data items and/or previously received data items (e.g., data items stored in the database 306) to identify redundant items, and eliminate redundancies when merging the data. In some implementations, the acquired data can include inconsistencies. The data merger 304 can resolve any inconsistencies and/or filter out unreliable data items. For instance, some data sources may provide with each data item (e.g., a piece of information) a respective reliability score indicative of a level or degree of reliability of the data item. In some implementations, the data merger 304 may assign a reliability score to a data item based on whether the data item contradicts with other data items. The data merger 304 can filter the data based on reliability scores or levels of various data items.

The database 306 can store data collected by the data collectors 302 and/or data processed by the discovery component 308. In some implementations, the database 306 can store data that is filtered and merged by the data merger 304. The database 304 can store the collected data in the form of a representation of the architecture and/or configuration of the discovered portion of the computer environment 202. For instance, the database 306 can store information related to discovered assets of the computer environment 202 in a form that depicts interconnections (e.g., physical or logic links) and/or dependencies between various assets. As used herein, an asset of the computer environment 202 can include a computing device, a network device, a storage device, other hardware device, a software component or application, a piece of data stored by or associated with the computer environment 202, or a combination thereof.

The discovery or reconnaissance component 308 can be configured or structured to determine, at each reconnaissance (or discovery) step or stage, the set of discovered assets and/or features of the computer environment 202. The discovery or reconnaissance component 308 can determine, trigger and/or monitor, at each reconnaissance step, the corresponding predefined set of queries or searches. In general, the reconnaissance system 206 can use the already acquired information or data (e.g., already discovered assets or features) to identify which queries or searches of the predefined set of queries or searches to trigger. For instance, the discovery or reconnaissance component 308 can maintain data structures (e.g., tables, trees, linked lists, etc.) defining a predefined set of queries or searches for each type of asset or feature of the computer environment 202. For example, the data structures can define the next set of queries or searches to be executed for a discovered server, the next set of queries or searches to be executed for a discovered employee, the next set of queries or searches to be executed for a discovered login ID, the next set of queries or searches to be executed for a discovered IP address, among others.

The reconnaissance system 206 can trigger the queries or searches to identify further or additional assets or features of the computer environment 202. Each of the modules 312 can be configured to trigger and/or manage queries or searches associated with a corresponding type of data and/or one or more corresponding data sources. For instance, one module 312 may be configured or structured to manage queries or searches for discovering additional domain names, another module 312 may be configured or structured to manage queries or searches for discovering additional hardware assets, while another module may be configured or structured to manage searches or queries for discovering additional users of the computer environment 202.

In some implementations, the hierarchical reconnaissance process 500 can start with a domain name associated with the computer environment 202 as input. Given the domain name, the predefined set of searches or queries associated with the first reconnaissance step 502 can include determining the person or entity who registered the domain name, the domain host (e.g., hosting servers), email servers associated with the domain, any SSL certificates issued to the domain, any logo associated with the domain name or a combination thereof. Each of these queries or searches is represented by a corresponding arrow originating at the node 508 and ending at one of the nodes 510a-512e. Each of the nodes 510a-512e represents the data or information acquired responsive to the corresponding query or search. For example, the node 510c can represent data acquired in identifying a server (e.g., an email server), such as the server name and/or server IP address. Also, with respect to node 510a, identifying the registering entity can include determining the name and/or email address of the registering entity.

The predefined set of searches or queries associated with the reconnaissance step 504 can include determining employees and/or service providers of the entity that owns the computer environment 202 (or registered the domain name) as well as other domains registered by the same entity. The arrows connecting node 510a to nodes 512a-512c depict these searches or queries. With respect to an identified host server(s) of the domain, as depicted by node 510b, the next predefined queries or searches can include identifying other domains hosted by the same host server(s), identifying features of the host server (e.g., OS, software running thereon, communication logs, configuration logs, security zone, etc.), or identifying a range of IP addresses based on an IP address of the host server(s) as depicted by nodes 512c-512f. Also, with respect to an identified email server, the discovery or reconnaissance component 308 can determine that one or more next queries/searches can include identifying users accessing or allowed to access the email server, identifying features of the email server (node 512d), identifying a range of IP addresses based on an IP address of the email server (node 512e), identifying communication ports of the email server (node 512f), and/or identifying email/login format (node 512g). For example, the format can be "FirstName.LastName" or last name preceded by first name initial, among others. Testing the login information can include providing potential user logins (with various formats) to a login webpage and recording the time delay for getting a response. In some implementations, the time of response can vary based on whether or not the user login is correct. The data collector(s) 302 can determine which login format is correct based on the recorded response times. For example, a relatively small response time can be indicative of a correct format. Also, given an identified SSL certificate, the next queries/searches can include identifying a corresponding certificate authority (node 512h), a certificate expiration date (node 512i) and/or a certificate type node 512j, among others. Also, a data collector 302 can use an identified logo (node 510e) to determine other domains or websites that use the logo.

Reconnaissance step 506 can include identifying assets accessible to service providers (node 514a), identifying email addresses or login IDs for various users of the computer environment 202 based on, for example, identified employees and/or identified email/login format (node 514b). Identifying assets accessible to a service provider can include determining the extent of physical access of the service provider to premises hosting assets of the computer environment 202, the extent of electronic access to assets of the computer environment 202, the nature of services provided by the service provider and whether it can lead to potential access (physical or electric) by others to assets of the computer environment 202. Also given an identified IP range (node 512e), a following search can include scanning the range of IP addresses to identify servers or devices, if any, associated with such IP addresses (node 514c). It is to be noted that the queries or searches depicted by the arrows in FIG. 5 and the corresponding nodes represent illustrative, but non-limiting, examples of the data to be acquired as part of the hierarchical reconnaissance process 500 and the order of acquisition of such data. According to other example implementations, the hierarchical reconnaissance process 500 can include more or less nodes, additional or alternative queries than the ones described with respect to FIG. 5, and/or more or less reconnaissance steps compared to those depicted in FIG. 5.

The method 400 can include discovering assets and/or features of the computer environment 202 responsive to performing or executing the hierarchical reconnaissance process (STEP 404), and generating or constructing an architecture of the computer environment 202 based on discovered assets and/or features (STEP 406). As discussed above with regard to STEP 402, the nodes of the hierarchical reconnaissance process 500 represent data acquired during the hierarchical reconnaissance process 500 that is indicative of assets and/or features of the computer environment 202. The discovery component 308 can scan data obtained during the hierarchical reconnaissance process 500 to identify discoverable assets of the computer environment 202. Such assets can include computer servers, devices, software applications or services, databases, or data files, among others, discovered during the hierarchical reconnaissance process 500.

Using the identified assets and corresponding features, the discovery component 308 can construct or generate at least a partial architecture of the computer environment 202 (STEP 406). The discovery component 308 can generate a representation, e.g., a network graph, of the partial architecture of the computer environment 202. For instance, the nodes of the network graph can represent discovered assets, and each link between a pair of nodes can represent a connection, dependency or other relationship between the pair of assets corresponding to the pair of nodes. The discovery component 308 can augment the nodes or links with metadata indicative of corresponding features identified during the hierarchical reconnaissance process 500. For example, the discovery component 308 can augment each node with metadata indicative of one or more features of the asset, such as a description of the corresponding asset, IP address of the asset, communication ports of the asset, list of users having access to the asset, login IDs recognized by the asset, configuration parameters of the asset, software installed on the asset and/or the security zone of the asset, among others. The discovery component 308 can augment the nodes In some implementations, the discovery component 308 can also receive internal information of the computer environment 202, and incorporate the internal information into the constructed architecture or corresponding representation. The internal information may not be available or accessible to entities (e.g., potential hackers) not associated with the computer environment 202. The internal information can include, for example, unpatched vulnerabilities, security holes, redundancy information and/or asset importance level for the discoverable assets. Incorporating such data or information into the architecture of the computer environment 202 or corresponding representation provides a better view or description of what is actually exposed to the outside world. In other words, merging discoverable data with internal data allows for a more accurate determination of the potential attacks on the computer environment 202.

In some implementations, the representation of the architecture of the computer environment 202 (or portion thereof defined by discovered assets and/or features) can include a visual representation, a representation based on data structures or a combination thereof. For example, the representation of the architecture can be defined using linked lists, trees, other data structures or a combination thereof. The visual representation can include a two-dimensional (2D) representation, a three-dimensional (3D) representation or a combination thereof.

The method 400 can include generating, based at least on the representation of the architecture of the computer environment, one or more attack vectors of the computer environment (STEP 408). An attack vector can represent a path or steps that can be used by a hacker or malicious intruder to gain access to the computer environment 202 or assets thereof. The security assessment component 310 can generate one or more attack vectors, using the reconstructed partial architecture or the corresponding representation. The security assessment component 310 can identify security holes associated with the identified discoverable assets of the computer environment 202, and generate the attack vectors based on the identified security holes. The security holes can include software or hardware vulnerabilities or misconfigurations exposing assets of the computer environment 202, among others.

Since the representation of the architecture of discovered assets can include interconnections or dependencies between various discovered assets as well as other asset features, the security assessment component 310 can identify direct and indirect security holes by using the representation of the architecture. Therefore, the security assessment component 310 can generate a more comprehensive set of attack vectors based on the representation of the architecture. Furthermore, the incorporation of internally available information of the computer environment 202 into the representation of the architecture of discoverable assets allows the security assessment component 310 to evaluate the severity of each attack vector. For example, the security assessment component 310 can use internal information indicative of (i) the importance of an asset (or importance of data associated with the asset), (ii) connections or dependencies of the asset, (iii) owner of the asset and/or (iv) redundancy of the asset, among others, to determine a severity level of attack vectors indicative of potential attacks on or leading to the asset.

In some implementations, the security assessment component 310 can update the architecture representation to incorporate generated attack vectors therein. For instance, the security assessment component 310 can add, for each asset in the reconstructed architecture, corresponding metadata indicative of attack vectors and/or security holes related to that asset. As such, the architecture representation can provide a visual description of the distribution of the attack vectors and/or security holes in relation to the assets of the computer environment 202. The reconnaissance system 216 can provide the representation of the architecture for display on a display device integrated in, or connected to, the reconnaissance system 216. The representation of the architecture can be interactive allowing for rendering, hiding or emphasizing different portions or categories of the data in the representation of the architecture.

C. Attack Risk Mitigation

Figure 6:
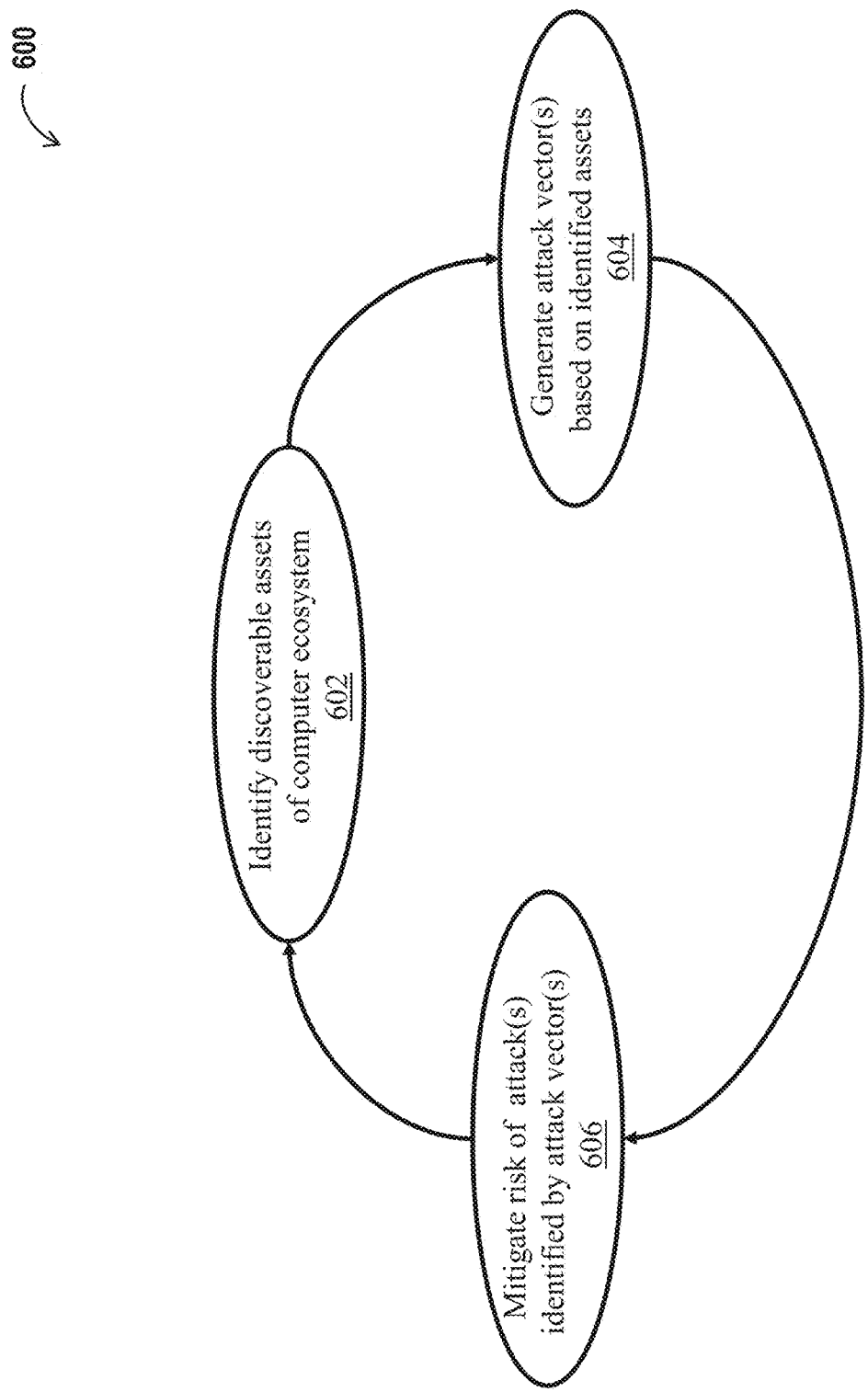
FIG. 6 shows a flow diagram illustrating a method for mitigating attack risk, according to an example embodiment.

FIG. 6 shows a flow diagram illustrating a method for mitigating attack risk 600, according to an example embodiment. The method 600 can include the reconnaissance system 216 identifying discoverable assets of the computer environment 202 (STEP 602), and generating attack vectors based on the identified discoverable assets (STEP 604). The method 600 can include the reconnaissance system 216 mitigating the risk of one or more potential attacks identified by the attack vectors (STEP 606). The reconnaissance system 206 can repeat method 600 on a regular or cyclic basis. For instance, the reconnaissance system 206 can execute method 600 periodically, e.g., every day, every week or every other time duration. In some implementations, the reconnaissance system 206 can execute method 600 responsive to specific events, such as detection of a new security threat.

The reconnaissance system 206 can perform STEPs 602 and 604 as discussed above with regard to FIG. 4. To mitigate the risk of potential attacks identified by the attack vectors, the reconnaissance system 206 can, for example, modify the configuration of one or more assets, automatically patch, or assign different priorities to, one or more vulnerabilities of the computer environment 202 and/or quarantine or disconnect an asset, among others. In some implementations, the reconnaissance system 206 can provide recommendations of such changes, or mitigation acts, to an administrator of the computer environment 202. In some implementations, the reconnaissance system 206 can provide recommendations of modifying the architecture of the computer environment 202 (or a portion thereof), for example, to increase or introduce redundancy. For example, the reconnaissance system 206 can provide recommendations to add assets of a given type (e.g., a network server or an authentication server). The reconnaissance system 206 can provide recommendations to add more security measures, such as additional requirements for user passwords or logins, employing dual authentication, modifying or adding security rules associated with a firewall or a combination thereof, among others.

The reconnaissance system 206 can perform mitigation tasks iteratively. For example, after each mitigation task, the reconnaissance system 206 can re-execute STEPs 602 and 604 to assess the effect of the mitigation task on the attack vectors. At each iteration, the reconnaissance system 206 can construct or generate the architecture of the discoverable assets and generate an updated representation thereof. Such approach, allows a user of the reconnaissance system 206 or an administrator of the computer environment 202 to assess, visually the impact or efficacy of each mitigation step or task. The user or administrator can then decide to maintain or roll back the performed mitigation step.

Each method described in this disclosure can be carried out by computer code instructions stored on computer-readable medium. The computer code instructions, when executed by one or more processors of a computing device, can cause the computing device to perform that method.

While the disclosure has been particularly shown and described with reference to specific embodiments, it should be understood by those skilled in the art that various changes in form and detail may be made therein without departing from the spirit and scope of the invention described in this disclosure.

While this disclosure contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A system comprising:
   one or more processors; and
   a memory storing computer code instructions, the computer code instructions, when executed by the one or more processors, cause the one or more processors to:
   perform a hierarchical process to discover information of the computer environment, the hierarchical process including a plurality of consecutive steps, wherein additional information searched at one step depends on information acquired in one or more previous steps of the plurality of consecutive steps;
   discover a plurality of assets and a plurality of features of the computer environment, responsive to performing the hierarchical process;
   generate, using the plurality of assets and the plurality of features of the computer environment, a representation of an architecture of the computer environment;
   identify one or more security holes by using the representation of the architecture;
   generate, based at least on the representation of the architecture of the computer environment and the one or more security holes, one or more attack vectors of the computer environment;
   determine a severity level of the one or more attack vectors based at least on an importance of an asset of the plurality of assets, an owner of the asset, one or more connections to or dependences of the asset, redundancy of the asset, a security zone of the asset and configuration parameters of the asset; and
   provide via an interactive display of the representation of the architecture a visual description of a distribution of the one or more attack vectors in relation to the plurality of assets, wherein the interactive display allows for hiding or emphasizing different portions of the representation of the architecture.

2. The system of claim 1, wherein each step of the plurality of consecutive steps of the hierarchical process includes, for each asset type, a corresponding predefined set of searches to be executed as part of a reconnaissance step.

3. The system of claim 2, wherein the one or more processors are configured to determine, at a step of the plurality of consecutive steps, one or more predefined sets of searches to be executed based on already discovered assets of the computer environment.

4. The system of claim 1, wherein the one or more processors are configured to use one or more data sources to search for information of the computer environment, the one or more data sources including at least one of:

an Internet scanner;
a search engine; or
a website.

5. The system of claim 4, wherein the one or more processors are further configured to merge data acquired from the one or more data sources.

6. The system of claim 1, wherein in generating a representation of an architecture of the computer environment, the one or more processors are configured to generate a network graph having a plurality of nodes and a plurality of links, each node representing a discovered asset and each link connecting a pair of nodes and representing at least one of a communication connection, a dependency or other relationship between a pair of assets corresponding to the pair of nodes.

7. The system of claim 6, wherein the one or more processors are further configured to augment each node of the network graph with metadata indicative of one or more features of the corresponding asset based on discovered information of the computer environment.

8. The system of claim 1, wherein in generate the one or more attack vectors, the one or more processors are configured to identify one or more security holes of the computer environment using the plurality of assets and the plurality of features of the computer environment discovered responsive to performing the hierarchical reconnaissance process.

9. The system of claim 8, wherein in identifying the one or more security holes of the computer environment, the one or more processors are configured to further use information received from the computer environment.

10. The system of claim 8, wherein the one or more processors are configured to mitigate a risk of a potential attack associated with one or more attack vectors by performing at least one of:
modify a configuration of one or more assets of the computer environment;
quarantine an asset of the computer environment;
automatically patch a vulnerability of the computer environment; or
assign different patching priorities to one or more vulnerabilities of the computer environment.

11. A method for reconnaissance of computer environments, the method comprising:
performing, by one or more processors, a hierarchical process to discover information of the computer environment, the hierarchical process including a plurality of consecutive steps, wherein additional information searched at one step depends on information acquired in one or more previous steps of the plurality of consecutive steps;
discovering, by the one or more processors, a plurality of assets and a plurality of features of the computer environment, responsive to performing the hierarchical process;
identifying one or more security holes by using the representation of the architecture;
generating, by the one or more processors and the one or more security holes, using the plurality of assets and the plurality of features of the computer environment, a representation of an architecture of the computer environment;
generating, by the one or more processors, based at least on the representation of the architecture of the computer environment, one or more attack vectors of the computer environment;
determining, by the one or more processors, a severity level of the one or more attack vectors based at least on an importance of an asset of the plurality of assets, an owner of an asset, one or more connections to or dependences of the asset, redundancy of the asset, a security zone of the asset and configuration parameters of the asset; and
providing via an interactive display of the representation of the architecture a visual description of a distribution of the one or more attack vectors in relation to the plurality of assets, wherein the interactive display allows for hiding or emphasizing different portions of the representation of the architecture.

12. The method of claim 11, wherein each reconnaissance step of the plurality of consecutive reconnaissance steps of the hierarchical reconnaissance process includes, for each asset type, a corresponding predefined set of queries or searches to be executed as part of a reconnaissance step.

13. The method of claim 12, further comprising determining, at each reconnaissance step of the plurality of consecutive reconnaissance steps and for each asset type, a subset of the corresponding predefined set of queries or searches to be executed based on already discovered information of the computer environment.

14. The method of claim 11, wherein the one or more processors are configured to use one or more data sources to search for information of the computer environment, the one or more data sources including at least one of:
an Internet scanner;
a search engine; or
a website,
the method further comprising merging data acquired from the one or more data sources.

15. The method of claim 11, wherein generating a representation of an architecture of the computer environment includes generating a network graph having a plurality of nodes and a plurality of links, each node representing a discovered asset and each link connecting a pair of nodes and representing at least one of a communication connection, a dependency or other relationship between a pair of assets corresponding to the pair of nodes.

16. The method of claim 15, further comprising augmenting each node of the network graph with metadata indicative of one or more features of the corresponding asset based on discovered information of the computer environment.

17. The method of claim 11, wherein generating the one or more attack vectors includes identifying one or more security holes of the computer environment using the plurality of assets and the plurality of features of the computer environment discovered responsive to performing the hierarchical reconnaissance process.

18. The method of claim 17, wherein identifying the one or more security holes of the computer environment includes further using information received from the computer environment.

19. The method of claim 17, further comprising mitigating a risk of a potential attack associated with one or more attack vectors by performing at least one of:
modifying a configuration of one or more assets of the computer environment;
quarantining an asset of the computer environment;
automatically patching a vulnerability of the computer environment; or
assigning different patching priorities to one or more vulnerabilities of the computer environment.

20. A non-transitory computer-readable medium storing computer executable instructions, the computer executable instructions when executed by one or more processors cause the one or more processors to:

perform a hierarchical process to discover information of the computer environment, the hierarchical process including a plurality of consecutive steps, wherein additional information searched at one step depends on information acquired in one or more previous steps of the plurality of consecutive steps;

discover a plurality of assets and a plurality of features of the computer environment, responsive to performing the hierarchical process;

generate, using the plurality of assets and the plurality of features of the computer environment, a representation of an architecture of the computer environment;

identify one or more security holes by using the representation of the architecture;

generate, based at least on the representation of the architecture of the computer environment, one or more attack vectors of the computer environment;

determine a severity level of the one or more attack vectors based at least on an importance of an asset of the plurality of assets, an owner of an asset, one or more connections to or dependences of the asset, redundancy of the asset, a security zone of the asset and configuration parameters of the asset; and provide via an interactive display of the representation of the architecture a visual description of a distribution of the one or more attack vectors in relation to the plurality of assets, wherein the interactive display allows for hiding or emphasizing different portions of the representation of the architecture.

* * * * *